United States Patent [19]

Antheunisse

[11] Patent Number: 5,474,855
[45] Date of Patent: Dec. 12, 1995

[54] HEAT SEALABLE POLYSTYRENE BASED BLENDS

[75] Inventor: Cornelis Antheunisse, Terneuzen, Netherlands

[73] Assignee: The Dow Chemical Company, Midland, Mich.

[21] Appl. No.: 285,615

[22] Filed: Aug. 3, 1994

Related U.S. Application Data

[63] Continuation of Ser. No. 49,934, Apr. 20, 1993, abandoned.

[51] Int. Cl.$^6$ .............................. C08L 51/04; C08L 53/02; B32B 27/08
[52] U.S. Cl. ................... 428/515; 428/519; 428/516; 428/523; 428/213; 428/220; 525/71; 525/78; 525/98; 525/221
[58] Field of Search .................... 525/98, 95, 221, 525/71, 78; 428/515, 519, 523, 516, 213, 220

[56] References Cited

U.S. PATENT DOCUMENTS

| | | | |
|---|---|---|---|
| 3,315,872 | 4/1967 | Carbone | 215/233 |
| 4,275,179 | 6/1981 | Sherman | 525/98 |
| 4,539,371 | 9/1985 | Gunesin | 525/221 |
| 4,647,509 | 3/1987 | Wallace et al. | 428/474.9 |
| 4,659,618 | 4/1987 | Yazaki et al. | 428/317.7 |
| 5,283,127 | 2/1994 | Blumenstein et al. | 428/476.3 |

FOREIGN PATENT DOCUMENTS

| | | |
|---|---|---|
| 524488A1 | 1/1993 | European Pat. Off. . |
| 3531036A1 | 3/1987 | Germany . |

OTHER PUBLICATIONS

Derwent 89–186708/26, Peter et al.
Derwent 92–090456/12, Schneider et al.
Derwent 91–216259/30, Hoenl et al.
Derwent 87–073379/11, Jenne et al.
Derwent 87–054616/08, Denki Kagaku Kogyo K K.
Derwent 90–059389/09, Ouyang, D. T.
Derwent 81–14373D/09, Asahi Dow KK, Cemendine Co. Ltd.

*Primary Examiner*—Paul R. Michl
*Assistant Examiner*—Mark L. Warzel

[57] ABSTRACT

A sealable, thermoplastic molding composition which can be employed to seal dairy food containers, comprising from about 20 to about 60% by weight of an optionally rubber-reinforced styrenic resin; from about 30 to about 70% of a styrene-butadiene-styrene block copolymer; and from about 4 to about 40% of a copolymer of ethylene and acrylic acid.

19 Claims, No Drawings

HEAT SEALABLE POLYSTYRENE BASED BLENDS

CROSS-REFERENCE TO RELATED APPLICATION

This is a continuation of application Ser. No. 08/049,934, filed Apr. 20, 1993 now abandoned.

BACKGROUND OF THE INVENTION

The present invention relates to styrenic resin compositions. More specifically, the invention relates to styrenic resin compositions which are heat-sealable.

The dairy industry commonly uses aluminum foil with a hot melt seal lacquer as a lid or sealing structure for many types of plastic containers, such as cups for yogurt and other dairy products. Since aluminum can resist high temperatures, the cycle time for sealing the lid to the container can be kept short. Unfortunately, the tear resistance of aluminum lids is not always sufficient, thereby resulting in tearing of the lid during peeling.

Lids prepared using polyvinyl chloride (PVC) or polyesters, such as PET, are also common in the marketplace. These plastic lids typically employ hot melt coatings to ensure adhesion to the container. The hot melt coatings melt at a temperature lower than the temperature at which the plastic top layer begins to deform or melt and stick to the seal bar. A second type of plastic lid commonly found in the marketplace includes one or more polystyrene-compatible resin layers with one or more polyester top or substrate layers coextruded with the polystyrene-compatible resin layer to improve the strength of the lid, and to prevent the hot-seal bar from sticking to the lid. A disadvantage of lidding systems employing PVC or polyesters is that these systems contain polymers which are not fully compatible with the polystyrene commonly employed in the container to which the lidding system is attached. Therefore, recycling of dairy containers containing diverse polymeric materials requires a preliminary, expensive separation step.

The above-described plastic lid materials are not fully compatible for recycling purposes with polystyrene dairy containers. It would be desirable to have an easily sealed plastic lidding system for thermoformed food containers that peels off easily, while retaining its physical integrity. Integrity is important in the case of food packaging in order to guarantee the shelf life of the packaged food. Additionally, it would be desirable to have a lidding system which is completely compatible with the polystyrene dairy container material, thereby allowing easy recyclability of container and lid without the need for expensive separation steps.

It would be further desirable in the dairy food packaging market to have a composition which would provide a controllable, peelable, adhesive seal after conventional heat sealing processes, which typically last from between 0.5 to 2 seconds, and which would display minimal changes in adhesion force between container and lid with seal bar temperature variations of up to 15° C. Further, it would be desirable if the sealing layer would soften, melt and stick to the container before the lid deforms significantly.

SUMMARY OF THE INVENTION

The present invention includes such a composition which can be employed to seal dairy food containers without the foregoing disadvantages, the composition comprising from about 20 to about 60% by weight of an optionally rubber-reinforced styrenic resin; from about 30 to about 70% of a styrene-butadiene-styrene block copolymer; and from about 4 to about 40% of a copolymer of ethylene and acrylic acid. Additionally, the invention includes an article which can be used as a lid for dairy containers, the article comprising a layer of an optionally rubber-reinforced styrenic resin; and a layer comprising an ethylene-acrylic acid copolymer, an optionally rubber-reinforced styrenic resin, and a styrene-butadiene-styrene block copolymer.

Advantageously, the composition and lid of the present invention are highly compatible for recycling with styrenic resins, such as polystyrene found e.g. in dairy food containers, and are easily peelable with simultaneous high resistance to tearing.

DETAILED DESCRIPTION OF THE INVENTION

The composition of the invention comprises an optionally rubber-reinforced styrenic resin, a styrene-butadiene-styrene block copolymer, and a copolymer of ethylene and acrylic acid.

Preferably, the composition of the invention comprises from about 40 to about 60 weight percent of the styrenic resin, and more preferably from about 45 to about 55 percent. Preferably, the styrenic resin is a rubber-modified, or high impact, styrenic resin.

The optionally rubber-reinforced styrenic resins are well-known to those skilled in the art, are widely available commercially, and can be prepared by any of the several polymerization methods known to those skilled in the art including, for example anionic, cationic or free radical, which is preferred, polymerization. The rubber-modified polymers can be prepared by well known methods including, for example, mass, emulsion, suspension and mass suspension methods. Mass polymerization is preferred. In general, continuous methods are employed for polymerizing the monovinyl aromatic compound.

The optionally rubber-reinforced styrenic resins of the present invention are polymers of one or more monovinyl aromatic compounds. Representative monovinyl aromatic compounds include styrene; alkyl substituted styrenes such as alpha-alkyl-styrenes (e.g., alpha methyl styrene and alpha ethyl styrene) and ring alkylated styrenes and isomers thereof (e.g., ortho ethyl styrene, 2,4-dimethyl styrene and vinyltoluene, particularly, ortho or para vinyl toluene); ring substituted halo-styrenes such as chloro-styrene, 2,4-dichloro-styrene and the like; and styrenes substituted with both a halo and alkyl group such as 2-chloro-4-methylstyrene; and vinyl anthracene. In general, the preferred monovinyl aromatic monomers are styrene, alpha methyl styrene, one or more of the vinyl toluene isomers, and/or mixtures of two or more of these, with styrene being the most preferred-monovinyl aromatic compound.

The monomer may optionally comprise minor amounts of one or more additional comonomers, preferably in an amount less than 10 percent by weight of the polymerizable monomer mixture. Suitable comonomers are unsaturated nitriles, for example acrylonitrile; alkyl acrylates and alkyl methacrylates, for example methyl methacrylate or n-butylacrylate; ethylenically unsaturated carboxylic acid monomers; and ethylenically unsaturated carboxylic acid derivative monomers including anhydrides and amides such as maleic anhydride, and maleimides such as N-phenyl maleimide.

The styrenic resin optionally is rubber-modified. The rubbers preferably employed are those polymers and copolymers which exhibit a second order transition temperature which is not higher than 0° C., preferably not higher than −20° C., and more preferably not higher than −40° C. as determined or approximated using conventional techniques, e.g., ASTM Test Method D-746-52 T. Unsaturated rubbers are more preferred. Highly preferred rubbers are alkadiene polymers. Suitable alkadienes are 1,3-conjugated dienes such as butadiene, isoprene, chloroprene or piperylene. Most preferred are homopolymers (excepting any coupling monomers) prepared from 1,3-conjugated dienes, with such homopolymers of 1,3-butadiene being especially preferred. Alkadiene copolymer rubbers containing small amounts, for example less than 15, preferably less than 10 weight percent, of other monomers such as monovinyl aromatics can also be employed.

The rubber is advantageously employed in amounts such that the rubber-reinforced styrenic resin contains from 2 to 20 percent, preferably from 3 to 17 percent, more preferably 3 to 15 weight percent rubber or rubber equivalent.

The term "rubber" or "rubber equivalent" as used herein to indicate weight amounts of rubber material is intended to mean, for a rubber homopolymer (such as polybutadiene), simply the amount of rubber, and for a block copolymer, the amount of the copolymer made up from monomer(s) which, when homopolymerized form a rubbery polymer. For example, for calculating the amount of rubber in a composition where a butadiene-styrene block copolymer rubber has been employed, the "rubber" or "rubber equivalent" of the composition is calculated based on only the butadiene component in the block copolymer. Obviously where physical properties or other aspects of the rubber material are measured, the complete rubber material including any comonomers is referred to.

Styrene-butadiene-styrene (SBS) block copolymers are also well known to those skilled in the art and are widely available in commerce. The SBS block copolymer suitably contains from about 10 to about 50 percent styrene by weight, preferably from about 20 to about 45 percent styrene. Examples of suitable SBS block copolymers include TUFPRENE A, available from Asahi Chemical Industry Company Ltd., FINAPRENE 414, available from The Petrofina Group, and VECTOR 6241-D, available from Dexco Polymers. Preferably, the composition of the invention comprises from about 35 to 55 weight percent of the SBS block copolymer, and more preferably from about 33 to about 45 percent of the SBS block copolymer. Preferably, the SBS block copolymer is rubbery.

Copolymers of ethylene and acrylic acid are well known to those skilled in the art and are commonly available commercially. The composition of the present invention advantageously includes from about 4 to about 40 weight percent of the ethylene acrylic acid (EAA) copolymer, preferably contains from 5 to about 15 percent of the EAA copolymer, and more preferably contains from about 8 to 12 percent EAA copolymer. The EAA copolymer suitably contains from about 6 to about 12 weight percent of acrylic acid units, and preferably contains from about 8 to about 10 percent of acrylic acid units. Examples of suitable EAA copolymers include PRIMACOR 1410 and PRIMACOR 1420R, which are available from The Dow Chemical Company.

The composition of the invention is conveniently obtained by blending the styrenic resin, the SBS block copolymer and the EAA copolymer using any of the techniques known to those skilled in the art for preparing polymer blends. Melt blending, such as by extrusion, is an example of a preferred method of preparation.

The blended composition may also contain additives such as pigments, plasticizers or lubricants such as mineral oil, butyl stearate or dioctyl phthalate; stabilizers, including antioxidants (e.g., alkylated phenols such as di-tert-butyl-p-cresol or phosphites such as trisnonyl phenyl phosphite); and mold release agents, e.g., zinc stearate.

The composition of the invention is useful as a heat sealable adhesive, and can be employed as a sealing layer together with a carrier or structural support layer. Accordingly, the invention includes articles, such as films, foils or sheets, which contain a heat-sealable layer, or sealing layer, prepared from the composition of the invention and a styrenic resin-containing support layer. The support layer and the heat sealable layer can be joined via techniques well known to those skilled in the art such as, for example, coextrusion or lamination. Advantageously, no glue layer is required to join the support layer to the heat sealable layer. Examples of materials suitable for use as the support include thermoplastics such as styrenic resins, such as polystyrene and high impact polystyrene, styrene-butadiene block copolymers, and mixtures of these materials. The material of the support layer should be compatible with the sealing layer composition and should have good physical properties. In general, in the case where the article of the invention is a thin sheet, or foil, which is to be used to make lids for containers, such as dairy food containers, the composition of the support layer depends upon the physical properties desired in the final lidding foil. The seal layer composition can be included in the support layer to provide for sufficient compatibility of the sealing layer to the support layer. Compatibility is important during peeling of the lid from the container. The amount of seal layer composition in the support layer preferably is at least about 30 weight percent, and more preferably is from about 32 to about 40 percent.

The heat-sealable, peelable lidding structure of the invention is obtained by combining the support layer and the sealing layer as described hereinabove. The thickness of the final lidding structure depends upon the physical properties that are required and the market requirements, including the processing behavior of the lids in food packaging machines. Lidding structures advantageously are from about 60 to about 350 µm thick, but thicker or thinner structures can be employed. Preferably, the structures are from about 80 to about 300 micron thick. Generally speaking, the seal layer is minimally about 5% of the total lidding structure thickness, and preferably is from about 7 to about 20% of the total thickness.

Preferably, the lidding structures of the invention include a top layer material, such as an ink and/or a lacquer coating, for the purpose of preventing the seal bar of a heat sealing machine of a heat sealing machine from sticking to the support layer of the lidding material. In this embodiment, the support layer is between the top layer and the seal layer.

The lidding structures of the invention can be sealed using any conventional heat sealing or impulse sealing machines which are commonly used for styrene polymer cups. As is well known to those skilled in the art, settings for sealing machines are determined by the temperature of the seal bar, pressure of the seal bar applied to the rim of the containers, the seal time, and the thickness of the lidding structure. Advantageous sealing conditions are at temperatures between about 120° and about 220° C., pressures between about 1 and about 10 bar, and seal times between about 0.5 and about 1.5 seconds. Preferably, the seal bar temperature is between about 160° and about 200° C., the seal pressure is between about 4 and about 7 bar, and the seal time is between about 0.7 and about 1.2 seconds.

The composition of the invention can be employed to prepare lids which exhibit a very reproducible, soft, peeling behavior. The composition provides an improved temperature range for sealing, i.e. acceptable peel strength values are obtainable over a wider temperature range using the composition of the invention as a sealing layer. The force necessary for separating the container and the lid can be defined as peel strength. Peel strength values depend on many variable factors, but values between about 80 and about 450 grams per 3 millimeter width of heat seal area, via a peeling movement in the length direction of the seal, are found to permit easy peelability at a given peel test temperature, peel speed and peel angle. For the purposes of the present invention, the term "peelability" means that the lidding structure and the container to which it is sealed can be manually separated without destruction of the container or the lid and without leaving parts of the seal layer resin on the rim of the container after peeling of the lid occurs.

SPECIFIC EMBODIMENTS OF THE INVENTION

The following experiments are set forth to illustrate the present invention and should not be construed to limit its scope. All parts and percentages are by weight and all temperatures are in degrees Celsius unless otherwise indicated.

Coextrusion

Lidding foil, from which individual lids can be stamped or cut, is prepared by coextrusion of a support layer and a sealing layer. The seal layer composition is prepared in a first extruder and the main support layer composition is prepared in a second extruder, both operating under normal extrusion conditions for polystyrene such that the compositions leave the extruders at temperatures in the range of from 195° to 198° C. The two compositions are fed directly from the extruders to a coextrusion feedblock to make coextruded films wherein the seal layer constitutes 10% of the total thickness.

Compositions of the main (m), or layer support, and the sealing (s) layer are given in Table 1. The pigment is in the main layer only and is a 50/50 blend of polystyrene and a white colorant consisting predominantly of $TiO_2$. The compositions are prepared from the following set of materials: the styrenic resin is STYRON 472, which is a high impact polystyrene available from The Dow Chemical Company; the EAA is PRIMACOR 1410 which is available from The Dow Chemical Company; and the SBS is TUFPRENE A, which is available from Asahi Chemical Industry Co. Ltd.

TABLE 1

| Composition | Compositions | | | |
|---|---|---|---|---|
| | Styrenic resin | EAA | SBS | Pigment |
| 1 (m) | 70 | 10 | 20 | — |
| 1 (s) | 50 | 10 | 40 | — |
| 2 (m) | 80 | | 20 | 6.67 |
| 2 (s) | 50 | 10 | 40 | |
| 3 (m) | 80 | | 20 | 6.67 |
| 3 (s) | 20 | 40 | 40 | |

Peel Strength Testing after Heat Sealing

The peeling strength of the lidding foil are determined by measuring the strength of a heat-sealed bond between the sealing layer of the coextruded lidding foil and a 1 mm thick base of rigid polystyrene, which represents the dairy container to which the lidding foil will be sealed. The resin for the rigid polystyrene base layer to which the lidding foil is adhered is STYRON 472. A SGPE 20 KOPP heat sealing machine is employed to generate a seal of 3 millimeters by 100 millimeters using a seal time of 1 second, a seal bar pressure of 7 bar, and various seal bar temperatures. For seal bar temperatures of 180° and 220° C. a seal time of 0.5 sec is also employed. A TEFLON polytetrafluoroethylene foil is employed between the seal bar and the lidding foil.

The peel strength of the test samples is measured using the method of ISO 8510-1:1990 using a 90° angle. Test samples are allowed to cool for at least 10 minutes before peeling. Peeling is conducted in the direction of the length of the test strips.

The heat sealed test samples are peeled at a constant speed of 100±5 millimeters per minute. The average peel force in grams per width of seal is determined based upon at least 3 samples. In addition to peel strength, tearing of the lidding foil is reported. The test results are summarized in Table 2.

TABLE 2

| | | Peel Strength (in grams) as a Function of Temperature | | | | | | | | |
|---|---|---|---|---|---|---|---|---|---|---|
| Comp'n | Thickness (μm) | Sealer-setting 120° C. | Sealer-setting 130° C. | Sealer-setting 140° C. | Sealer-setting 150° C. | Sealer-setting 160° C. | Sealer-setting 170° C. | Sealer-setting 180° C. | Sealer-setting 200° C. | Sealer-setting 220° C. |
| 1 | 100 | 10 | 20–40(VR) | 60–80(VR) | 60–80(VR) | 160(VR) | 160–180(R) | 200(VR) 120 (0.5 sec) | 300–400 | T |
| 2 | 210 | <10 | <10 | <10 | 50(R) | 50(R) | 80(VR) | 100(VR) 20 (0.5 sec) | 160(VR) | 210 100 (0.5 sec) |
| 3 | 100 | 10 | 10 | 25(VR) | 40(VR) | 40(VR) | 60(VR) | 60–100 40 (0.5 sec) | 80–100 (VR) | 100(VR) 90 (0.5 sec) |

VR = very reproducible
R = reproducible
T = tearing

As can be seen from Table 1, the addition of white pigment has little effect on the sealing behavior of lidding structures. Compare composition 1 to composition 2. Very reproducible, constant peeling forces over a wide seal bar temperature range are observed for compositions 1, 2 and 3 without tearing. PRIMACOR 1410 need not be employed in the support or main layer.

The data indicates that seal times of 0.5 sec are feasible; this is significant as this seal time is towards the low end of the range of seal times employed with aluminum lids. Accordingly, the lids of the invention can be employed as a replacement for aluminum lids.

What is claimed is:

1. A composition comprising a blend of: from about 20 to about 60% by weight of an optionally rubber-reinforced styrenic resin; from about to about 70% of a styrene-butadiene-styrene block copolymer comprising from about 10 to about 50% styrene units; and from about 4 to 40% of a copolymer of ethylene and acrylic acid; said percentages being based on the total weight of the composition.

2. The composition of claim 1 comprising from about 45 to about 55 percent of the styrenic resin.

3. The composition of claim 1 wherein the styrenic resin is rubber-reinforced.

4. The composition of claim 1 wherein the styrenic resin is not rubber-reinforced.

5. The composition of claim 1 wherein from about 33 to about 55% of the styrene-butadiene-styrene block copolymer is employed.

6. The composition of claim 5 wherein the amount of styrene-butadiene-styrene block copolymer is from about 35 to about 45%.

7. The composition of claim 1 comprising from about 8 to about 12% of the copolymer of ethylene and acrylic acid.

8. The composition of claim 1 wherein the styrene-butadiene-styrene block copolymer comprises from about 20 to about 45% styrene units.

9. The composition of claim 1 comprising from about 5 to about 15% of the copolymer of ethylene and acrylic acid.

10. The composition of claim 1 wherein the copolymer of ethylene and acrylic acid comprises from about 6 to about 12% acrylic acid.

11. A composition comprising a blend of: from about 45 to about 55% by weight of a rubber-reinforced styrenic resin; from about 33 to about 55% by weight of a styrene-butadiene-styrene block copolymer comprising from about 10 to about 50% styrene units; and from about 4 to about 40% by weight of an ethylene acrylic acid copolymer; said percentages being based on the total weight of the composition.

12. The composition of claim 11 wherein the copolymer of ethylene and acrylic acid comprises from about 6 to about 12% acrylic acid, and the resin As rubber reinforced.

13. A heat-sealable composite, comprising a heat sealable layer comprising the composition of claim 1, and a support layer of an optionally rubber-reinforced styrenic resin.

14. The composite of claim 13 which is in film or sheet form.

15. The composite of claim 13 wherein the thickness of the heat sealable layer is at least about 5% of the thickness of the composite.

16. The composite of claim 13 further comprising a top layer comprising an ink or lacquer.

17. The composite of claim 13 which is formed via coextrusion.

18. The composite of claim 13 which has a thickness of from about 80 to about 300 micron.

19. The composition of claim 11 comprising from 5 to about 15% by weight of an ethylene acrylic acid copolymer which comprises from about 6 to about 12% acrylic acid.

* * * * *

UNITED STATES PATENT AND TRADEMARK OFFICE
CERTIFICATE OF CORRECTION

PATENT NO. : 5,474,855
DATED : Dec. 12, 1995
INVENTOR(S) : Cornelis Antheunisse

It is certified that error appears in the above-identified patent and that said Letters Patent is hereby corrected as shown below:

Claim 1, column 7, line 9, following "about" insert --30--

Claim 12, column 8, line 14, "as" should correctly read --is--

Signed and Sealed this

Twenty-fourth Day of November, 1998

Attest:

BRUCE LEHMAN

Attesting Officer

Commissioner of Patents and Trademarks